(No Model.)

N. B. GINOCHIO.
MAGNETO GENERATOR.

No. 438,434. Patented Oct. 14, 1890.

Witnesses
Jno. G. Hinkel
H. S. McArthur

Inventor
Noel B. Ginochio
By his Attorneys
Foster & Freeman

UNITED STATES PATENT OFFICE.

NOEL B. GINOCHIO, OF NEW YORK, N. Y., ASSIGNOR OF ONE-HALF TO ELIAS M. GREENE, OF SAME PLACE.

MAGNETO-GENERATOR.

SPECIFICATION forming part of Letters Patent No. 438,434, dated October 14, 1890.

Application filed February 4, 1890. Serial No. 339,119. (No model.)

*To all whom it may concern:*

Be it known that I, NOEL B. GINOCHIO, a citizen of the United States, and a resident of the city, county, and State of New York, have invented certain new and useful Improvements in Magneto-Generators, of which the following is a specification.

My invention relates to magneto-generators, and more especially to that class intended to be used in connection with telephone systems for calling up the central office or the subscriber; and it has for its object to provide such a generator which shall be simple, cheap, and effective in its operations, and shall at the same time be capable of giving different signals for different purposes.

To these ends my invention consists in a magneto-generator constructed, arranged, and operating substantially as hereinafter pointed out.

Figure 1:
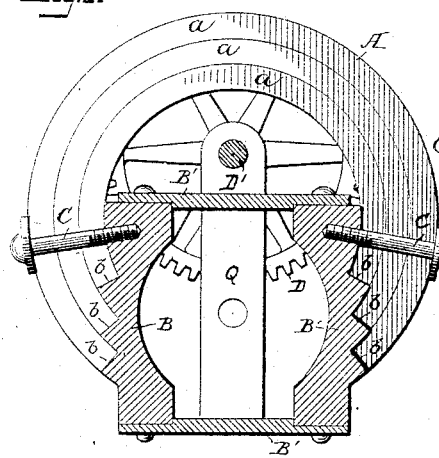
Figure 2:
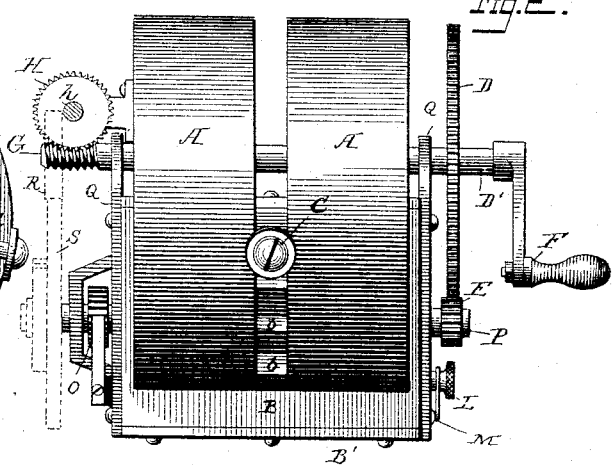
Figure 3:
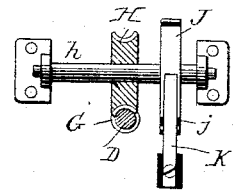
Figure 4:
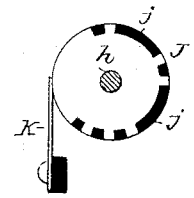
Figure 5:
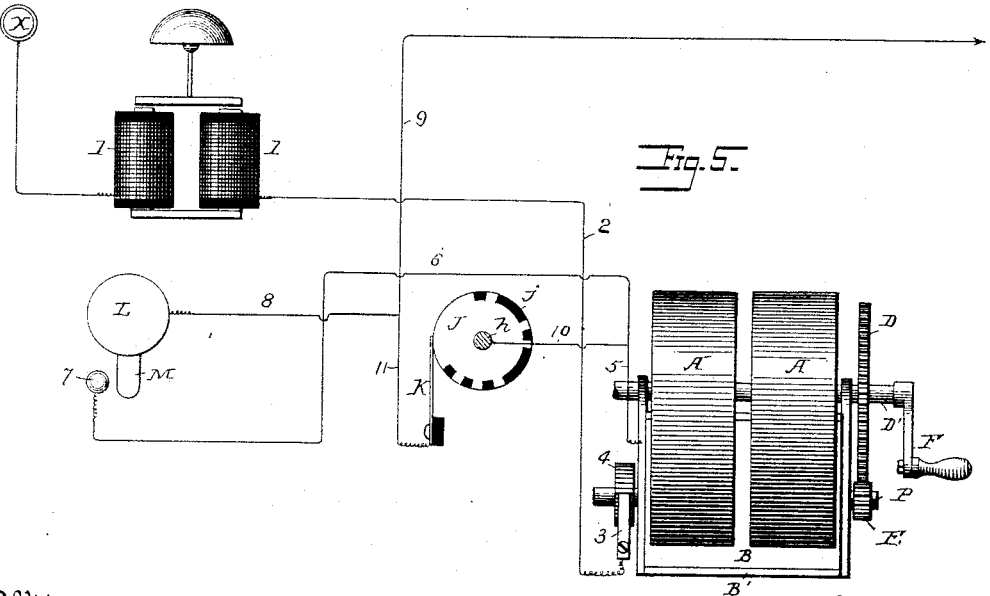

Referring to the accompanying drawings, Figure 1 is a transverse section of a generator embodying my invention, showing more particularly the form of the magnets and pole-pieces. Fig. 2 is a side elevation of the same. Fig. 3 is a detail showing one manner of operating the circuit-controller. Fig. 4 is a plan view of said controller. Fig. 5 is a diagram illustrating one way of arranging the circuits.

In the construction and use of magneto-generators for the purpose of signaling it is exceedingly desirable to make a simple and compact apparatus, which at the same time shall be capable of generating a comparatively powerful current, so as to insure the operation of the bells on the lines at greater or less distance from the operating-station. To accomplish this result, I construct the generator substantially as hereinafter set forth.

A A represent two field-magnets, each made up of a number of permanent steel magnets *a*, preferably substantially in the form of a ring and being nested one within the other. Connected to the ends of these ring-shaped permanent magnets are the pole-pieces B B, which are shaped to receive the armature between them, and which are connected by non-magnetic plates B', and are attached to the field-magnets in any suitable way, as by the screw-bolts C. In order that the magnets may make good magnetic connection with the pole-pieces, I cast on the outer sides of the pole-pieces steps or projections *b* of such a shape as will make good and square fittings for the squared ends of the field-magnets, and in this way I find that I can obtain the best results, the lines of magnetic force passing directly from the magnets into the pole-pieces through good magnetic conductors. When I use two or more sets of field-magnets A, as shown in Fig. 2, the pole-pieces for all the sets may be made in one piece and the sets of magnets attached thereto in the manner described, with the ends of the permanent magnets resting on the projections or ribs *b*.

The commutator O may be of any usual construction, and is preferably mounted upon its shaft P, which is supported in bearings Q, attached to the pole-pieces of the magnets. One end of this armature-shaft is provided with a gear-wheel E, or other suitable connections, meshing into the larger gear-wheel D, mounted upon the shaft D', which is also preferably supported in the frame Q, and is driven by a suitable crank or handle F.

In the form shown in Fig. 2 I have connected to the field-magnets by suitable standards a shaft *h*, upon which is mounted a worm-gear H, meshing with a worm G, formed on the end of the driving-shaft D', and also mounted on this shaft *h* is a circuit-controller or commutator J, having a number of insulating-spaces *j*, arranged around its periphery in any predetermined desired order, and a spring-contact K is arranged to bear on this periphery and to aid in sending the desired signal.

Instead of using the worm and gear, I may mount on the end of the shaft D' a small gear-wheel R, (shown in dotted lines in Fig. 2,) which will mesh with a larger gear-wheel S, loosely mounted on an extension of the armature-shaft and connected to the circuit-controller or commutator J.

In either construction it will be seen that the driving-shaft is so geared that at each revolution the armature will make a number of revolutions, while the commutator or circuit-controller will only make one revolution to a number of revolutions of the driving-shaft.

A suitable switch L is mounted on the generator or the case containing it, and is provided with a contact-arm M, adapted to complete the circuit through one or the other channels, so that the generator may be operated to produce a continuous ringing of the bells in line or passing through the commutator to cause the bell to give any predetermined signal or series of signals.

Referring more particularly to Fig. 5, the circuit may be traced as follows: Starting from the ground at X, which may be at a distant station or otherwise, it passes through the bell-magnets 1, and thence through the conductor 2 to the brush 3, bearing on the commutator 4 of the armature of the generator. Thence it passes through the coils of the armature and out through the machine by means of the conductor 5, and if a continuous signal is to be given it passes by the conductor 6 to the point 7, on which the contact M of the switch L is placed. Thence it passes by the conductor 8 to the ground-line 9, and upon turning the crank a continuous ringing of the bell or any number of them in circuit will be produced. When, however, it is desired to send a predetermined signal, the switch L is turned and the circuit broken at the point 7, and then it passes, as before, from the ground at X to the point 5, and by the shunt 10 to the shaft $h$ of the circuit-controller J, and thence by contact K through the conductor 11 to 9, and thence to ground.

It will thus be seen that the operation of the generator will cause the bell or bells to ring in accordance with the positions of the insulating-spaces on the circuit-controller J, and by this means any signal or system of signals may be operated to notify the subscribers or other party.

It is evident that the commutator or distributer may be duplicated, so that any number of prearranged signals may be produced, and the switch being properly formed the desired one may be connected in circuit. It is also evident that other arrangements of the circuits may be made, in which the current generated may be made to pass directly to the bells from the generator or through the circuit-distributer. These will be evident to any electrician skilled in the art.

While I have shown and described the preferred embodiment of my invention it will be evident that the details of construction and arrangement may be varied without departing from the general principles thereof.

What I claim is—

1. A magneto-generator in which the magnets are made up of a series of permanent ring-shaped pieces connected to pole-pieces, the pole-pieces being provided with projections conforming to the shape of the ends of the magnets, substantially as described.

2. A magneto-generator in which the magnet consists of a series of nested ring-shaped permanent magnets connected to pole-pieces secured thereto, the pole-pieces having inclined projections on their sides fitting the ends of the separate permanent magnets, substantially as described.

3. A magneto-generator consisting of the field-magnets and armature, a driving-shaft connected to drive said armature, a circuit-controller driven by said shaft, and a switch and circuits, whereby the circuits may be completed directly from the armature or through the circuit-controller, substantially as described.

4. A magneto-generator having a driving-shaft mounted thereon, connections from the driving-shaft to the armature for rapidly rotating the same, a circuit-controller also mounted thereon, and connections from the driving-shaft to rotate the circuit-controller at a slower speed than the armature, and a switch for completing the circuits directly through the armature or through the circuit-controller, substantially as described.

5. A magneto-generator provided with a driving-shaft, gear-connections between said shaft and the armature, a worm on said shaft, a worm-wheel mounted on the generator, a circuit controller mounted on the shaft of the worm-wheel, and a switch controlling the circuit through the circuit-controller, substantially as described.

In testimony whereof I have signed my name to this specification in the presence of two subscribing witnesses.

NOEL B. GINOCHIO.

Witnesses:
E. H. VAN HEUSEN,
RICHD. MULLOUNEY.